(12) United States Patent
Moore (10) Patent No.: US 9,639,678 B2
(45) Date of Patent: May 2, 2017

(54) IDENTITY RISK SCORE GENERATION AND IMPLEMENTATION

(75) Inventor: George M. Moore, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 713 days.

(21) Appl. No.: 13/539,267

(22) Filed: Jun. 29, 2012

(65) Prior Publication Data

US 2014/0007179 A1   Jan. 2, 2014

(51) Int. Cl.
*G06F 21/31* (2013.01)
*H04L 29/06* (2006.01)

(52) U.S. Cl.
CPC ............ *G06F 21/316* (2013.01); *G06F 21/31* (2013.01); *H04L 63/08* (2013.01); *H04L 63/10* (2013.01); *H04L 63/102* (2013.01); *H04L 63/105* (2013.01); *G06F 2221/2111* (2013.01)

(58) Field of Classification Search
CPC .......... G06F 21/31; G06F 21/33; G06F 21/34; G06F 21/12
USPC ......................................... 726/1, 2, 5, 9, 10
See application file for complete search history.

(56) References Cited

U.S. PATENT DOCUMENTS

| | | | |
|---|---|---|---|
| 6,108,683 A * | 8/2000 | Kamada | G06F 9/4881 718/102 |
| 7,991,716 B2 | 8/2011 | Crooks et al. | |
| 8,452,980 B1 * | 5/2013 | Black et al. | 713/185 |
| 8,776,168 B1 * | 7/2014 | Gibson et al. | 726/1 |
| 8,880,435 B1 * | 11/2014 | Catlett et al. | 705/75 |
| 2004/0181665 A1 * | 9/2004 | Houser | G06Q 40/02 713/158 |
| 2005/0166065 A1 * | 7/2005 | Eytchison et al. | 713/189 |
| 2005/0240756 A1 * | 10/2005 | Mayer | G06F 9/4418 713/2 |
| 2006/0020814 A1 * | 1/2006 | Lieblich et al. | 713/182 |

(Continued)

FOREIGN PATENT DOCUMENTS

| CN | 101656607 A | 2/2010 |
|---|---|---|
| EP | 1050993 A2 | 11/2000 |

OTHER PUBLICATIONS

"CA Arcot RiskFort", Retrieved on: Mar. 6, 2012, Available at: http://www.ca.com/~/media/Files/productbriefs/ca-arcot-risk-fort-ps-us-en.pdf.

(Continued)

*Primary Examiner* — Jung Kim
*Assistant Examiner* — Ngoc D Nguyen
(74) *Attorney, Agent, or Firm* — Workman Nydegger (57) ABSTRACT

Embodiments are directed to providing an identity risk score as part of an authentication assertion, applying operating heuristics to determine an operating application's validity and to providing identity risk scores to requesting third parties. In one scenario, an authentication server receives from a cloud service portal various user credentials from a user. The user credentials identify a user to the authentication server. The authentication server verifies the user's identity using the received credentials and generates an identity risk score based on one or more identity factors. The identity factors indicate a likelihood that the user is a valid user. The authentication server encapsulates the generated identity risk score in an authentication assertion and sends the authentication assertion that includes the generated identity risk score to the cloud service portal.

19 Claims, 5 Drawing Sheets

(56) References Cited

U.S. PATENT DOCUMENTS

| | | |
|---|---|---|
| 2006/0282660 A1 | 12/2006 | Varghese et al. |
| 2007/0208934 A1 | 9/2007 | Heffez |
| 2007/0239604 A1* | 10/2007 | O'Connell et al. ............ 705/50 |
| 2008/0103800 A1 | 5/2008 | Domenikos et al. |
| 2008/0178259 A1* | 7/2008 | Alperovitch ....... G06Q 30/0633 726/2 |
| 2008/0178299 A1* | 7/2008 | Merkle ................. G06F 21/10 726/29 |
| 2009/0006230 A1 | 1/2009 | Lyda et al. |
| 2009/0177529 A1* | 7/2009 | Hadi ............................. 705/10 |
| 2009/0300720 A1* | 12/2009 | Guo ................... G06Q 10/107 726/3 |
| 2010/0125911 A1* | 5/2010 | Bhaskaran ..................... 726/23 |
| 2010/0162386 A1 | 6/2010 | Li et al. |
| 2010/0211996 A1 | 8/2010 | McGeehan et al. |
| 2011/0131122 A1 | 6/2011 | Griffin et al. |
| 2011/0153727 A1* | 6/2011 | Li ......................... G06F 9/5055 709/203 |
| 2011/0184838 A1 | 7/2011 | Winters et al. |
| 2011/0225650 A1* | 9/2011 | Margolies ............ G06F 21/554 726/22 |
| 2011/0239010 A1* | 9/2011 | Jain ...................... G06F 1/3209 713/310 |
| 2011/0247069 A1* | 10/2011 | Slater .............................. 726/22 |
| 2011/0265162 A1* | 10/2011 | Alavandar et al. ............... 726/7 |
| 2011/0314558 A1 | 12/2011 | Song et al. |
| 2012/0159590 A1* | 6/2012 | Novack et al. ................... 726/7 |
| 2013/0239206 A1* | 9/2013 | Draluk et al. .................. 726/19 |
| 2013/0254847 A1* | 9/2013 | Adams et al. ..................... 726/4 |

OTHER PUBLICATIONS

Mashima, et al., "Using Identity Credential Usage Logs to Detect Anomalous Service Accesses", In Proceedings of the 5th ACM Workshop on Digital Identity Management, Nov. 9, 2009, pp. 73-80.

"International Search Report & Written Opinion for PCT Patent Application No. PCT/US2013/047446", Mailed Date: Sep. 27, 2013, Filed Date: Jun. 25, 2013, 9 Pages.

"First Office Action and Search Report Issued in Chinese Application No. 201310262770.9", Mailed Date: Dec. 4, 2015, 13 Pages.

"Second Office Action Issued in Chinese Patent Application No. 201310262770.9", Mailed Date: Oct. 17, 2016, 13 Pages.

Chinese Office Action issued in CN application #201310262770.9 mailed Mar. 1, 2017.

* cited by examiner

IDENTITY RISK SCORE GENERATION AND IMPLEMENTATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications allow access to other computer systems. For instance, a web browser may allow a user to retrieve information from another computer system such as a web server. Other applications may allow users to access services provided by distributed systems such as cloud computer systems. These applications may allow a user to log in to a cloud portal and access computing resources such as services or virtual machines. The user's identity may be validated initially, but it typically not validated thereafter. Moreover, once validated, a user's use of the cloud services or computational resources is not heavily monitored.

BRIEF SUMMARY

Embodiments described herein are directed to providing an identity risk score as part of an authentication assertion, applying operating heuristics to determine an operating application's validity and to providing identity risk scores to requesting third parties. In one embodiment, an authentication server receives from a cloud service portal various user credentials from a user. The user credentials identify a user to the authentication server. The authentication server verifies the user's identity using the received credentials and generates an identity risk score based on one or more identity factors. The identity factors indicate a likelihood that the user is a valid user. The authentication server encapsulates the generated identity risk score in an authentication assertion and sends the authentication assertion that includes the generated identity risk score to the cloud service portal.

In another embodiment, a computer system applies operating heuristics to determine an operating application's validity. The computer system accesses various application operation heuristics including a generated identity risk score that is associated with a cloud service user. The identity risk score is based on one or more identity factors that indicate the likelihood that the user is a valid user. The computer system applies the application operation heuristics to an application initiated by the cloud service user that is in operation to determine whether the application is being used fraudulently or legitimately. Upon determining that the application is being used fraudulently, the computer system limits use of the application by a specified amount and upon determining that the application is being used legitimately, permits continued use of the application.

In yet another embodiment, a computer system provides identity risk scores to requesting third parties. The computer system receives a request from a third party for an identity risk score which is generated based on identity factors that indicate the likelihood that a specified cloud service user is a valid user. The computer system validates the third party requestor's identity as one who is authorized to receive identity risk scores for the specified cloud service user and accesses the requested identity risk score. The computer system then sends the requested identity risk score to the third party requestor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Embodiments described herein are directed to providing an identity risk score as part of an authentication assertion, applying operating heuristics to determine an operating application's validity and to providing identity risk scores to requesting third parties. In one embodiment, an authentication server receives from a cloud service portal various user credentials from a user. The user credentials identify a user to the authentication server. The authentication server verifies the user's identity using the received credentials and generates an identity risk score based on one or more identity factors. The identity factors indicate a likelihood that the user is a valid user. The authentication server encapsulates the generated identity risk score in an authentication assertion and sends the authentication assertion that includes the generated identity risk score to the cloud service portal.

In another embodiment, a computer system applies operating heuristics to determine an operating application's validity. The computer system accesses various application operation heuristics including a generated identity risk score that is associated with a cloud service user. The identity risk score is based on one or more identity factors that indicate the likelihood that the user is a valid user. The computer system applies the application operation heuristics to an application initiated by the cloud service user that is in operation to determine whether the application is being used fraudulently or legitimately. Upon determining that the application is being used fraudulently, the computer system limits use of the application by a specified amount and upon determining that the application is being used legitimately, permits continued use of the application.

In yet another embodiment, a computer system provides identity risk scores to requesting third parties. The computer system receives a request from a third party for an identity risk score which is generated based on identity factors that indicate the likelihood that a specified cloud service user is a valid user. The computer system validates the third party requestor's identity as one who is authorized to receive identity risk scores for the specified cloud service user and accesses the requested identity risk score. The computer system then sends the requested identity risk score to the third party requestor.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
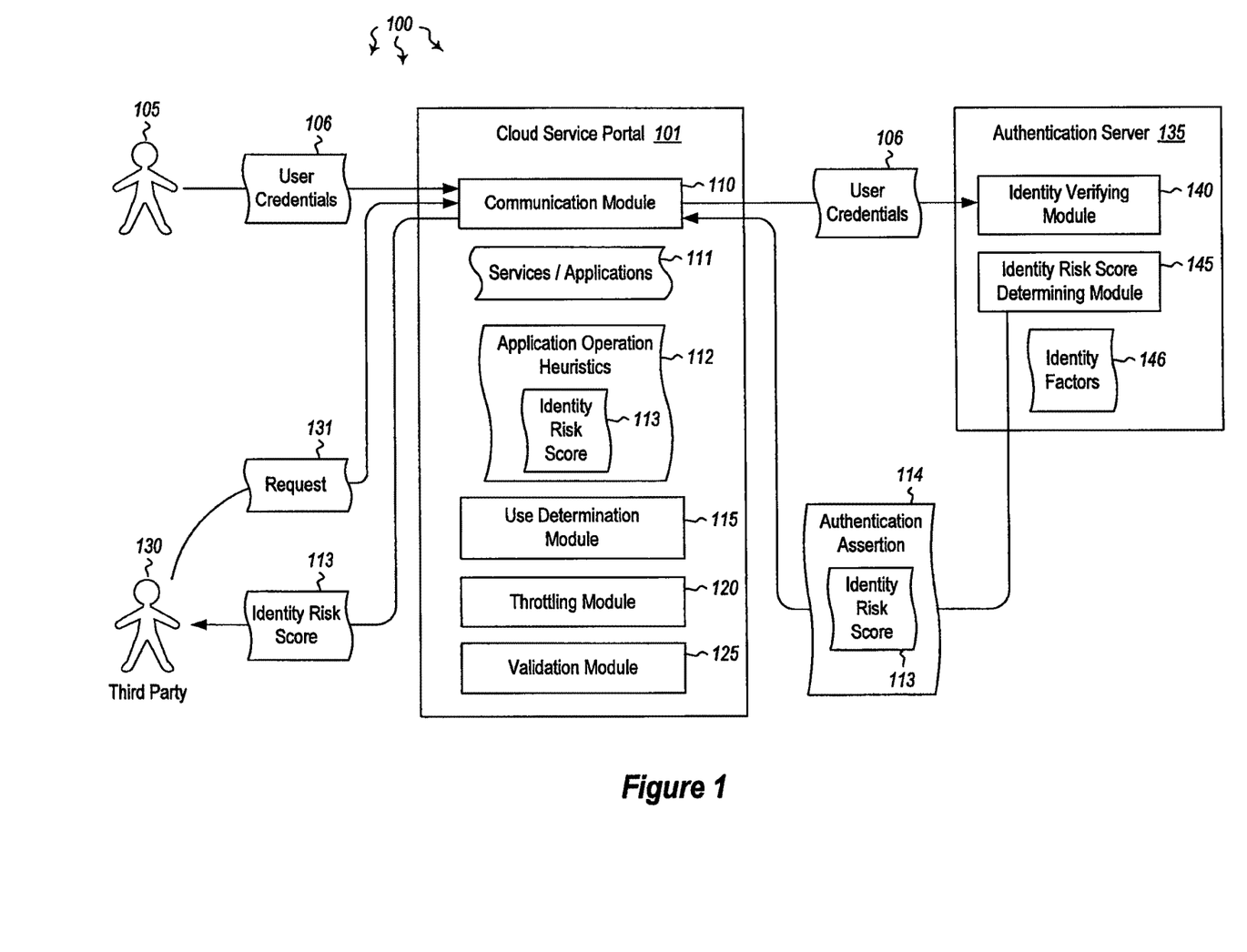
FIG. 1 illustrates a computer architecture in which embodiments of the present invention may operate including providing an identity risk score as part of an authentication assertion.

FIG. 1 illustrates a computer architecture 100 in which the principles of the present invention may be employed. Computer architecture 100 includes computer system 101. Computer system 101 may be any type of local or distributed computer system, including a cloud computing system. The computer system includes various different modules for performing a variety of different functions. For instance, the communication module 110 of cloud service portal 101 may be configured to receive and transmit data items such as user credentials 106. User 105 may send user credentials 106 to the cloud service portal for authentication to that portal. The user credentials 106 may be forwarded by the communication module to an authentication server 135. The identity verifying module 140 may be configured to verify user 105's identity. Once the user is verified, the user may have access to some of the services or applications 111 provided by the cloud services portal 101.

In some cases, when a new or existing user (e.g. 105) attempts to login to the cloud service portal 101, the portal may already know at least some information about that user. For example, the portal may know whether the user has been involved in fraudulent activities, either directly or indirectly. For instance, if the user 105 attempts to log in from a known-bad set of internet protocol (IP) addresses, that user may be associated with other users who have used the cloud services portal in a fraudulent manner. Alternatively, if the user has a history of normal use within predefined parameters, the user may be identified as a good user, or even a very important user.

For each user that attempts to log in to the cloud services portal 101 and/or to the authentication server 135, an identity risk score may be generated 113 (e.g. by identity risk score determining module 145). The identity risk score may indicate a numerical value corresponding to the level of risk the user provides to the cloud services portal. For example, a user may have a very low identity risk score which, in general, means that the user is a good user and has not used the portal in a fraudulent manner (e.g. has not attempted to gain access to processing time or processing cores than the user has paid for). If the user has a high identity risk score, the user may be more likely to use the portal in a fraudulent manner. Such users may be watched more carefully, and, if certain thresholds are met, the user's application use may be throttled. The identity risk score may be based on various factors, which will be explained in greater detail below.

The generated identity risk score 113 may be sent from the authentication server 135 to the cloud services portal 101 as part of an authentication assertion 114 or claim. In some cases, that claim may be a Security Assertion Markup Language (SAML) claim. In these cases, the claims or assertions are generated and transmitted in a standards-based manner. As such, a service (e.g. 111) may directly consume the identity risk score without needing to perform secondary connections to the authentication server or to another anti-fraud service. A common user identity may be generated that is used across applications and services. The common user identity may be based upon an encoded 128-bit value, and may be a durable reference to that identity. This may be referred to herein as a "security principal", and the identity risk score 113 can be associated with the security principal.

As various users use the services provided by cloud service portal 101, fraud conditions may change over time. As the fraud conditions change, the identity risk score can updated and stored in a central directory associated with that security principal. In this manner, even if the user is currently logged in, a service can query the central directory using various directory application programming interfaces (APIs) for any updated risk scores. This would allow the calling service to evict users even while the users are currently authenticated. Thus, fraudulent users may be evicted in a quick and efficient manner.

As mentioned above, the identity risk score may be transmitted as a SAML claim. As such, it may be discoverable by developers using the cloud service portal's directory. As one can never absolutely trust an identity (even if, for example, that identity is attested and owned by a large multinational corporation), precautions are to be taken with every user. For instance, a user's machine may become infected with a computer virus. The user may use that same machine to log in to the cloud services portal. Then, any services used by the user may be privy to the user's updated identity risk score. The user's applications may receive a set of SAML claims which indicate that the user's account is considered "risky". Based on this information, the user may be denied access to his or her applications and an alarm may be raised to the user's IT administrators. The IT administrators may then launch an investigation and determine that the user's machine has been compromised.

Each service may have its own set of policies identifying actions to be taken based on certain preset thresholds in the identity risk score being met. For example, a score of 80% may be risky enough to limit certain key actions on the user's account until further proof of ownership can be provided. For instance, the user may be required to wait 30 days (e.g., one full billing cycle) before being pulled out of quarantine and granted full rights to use all aspects of the service. These concepts will be explained further below with regard to methods 200, 300 and 400 of FIGS. 2, 3 and 4, respectively.

Figure 2:
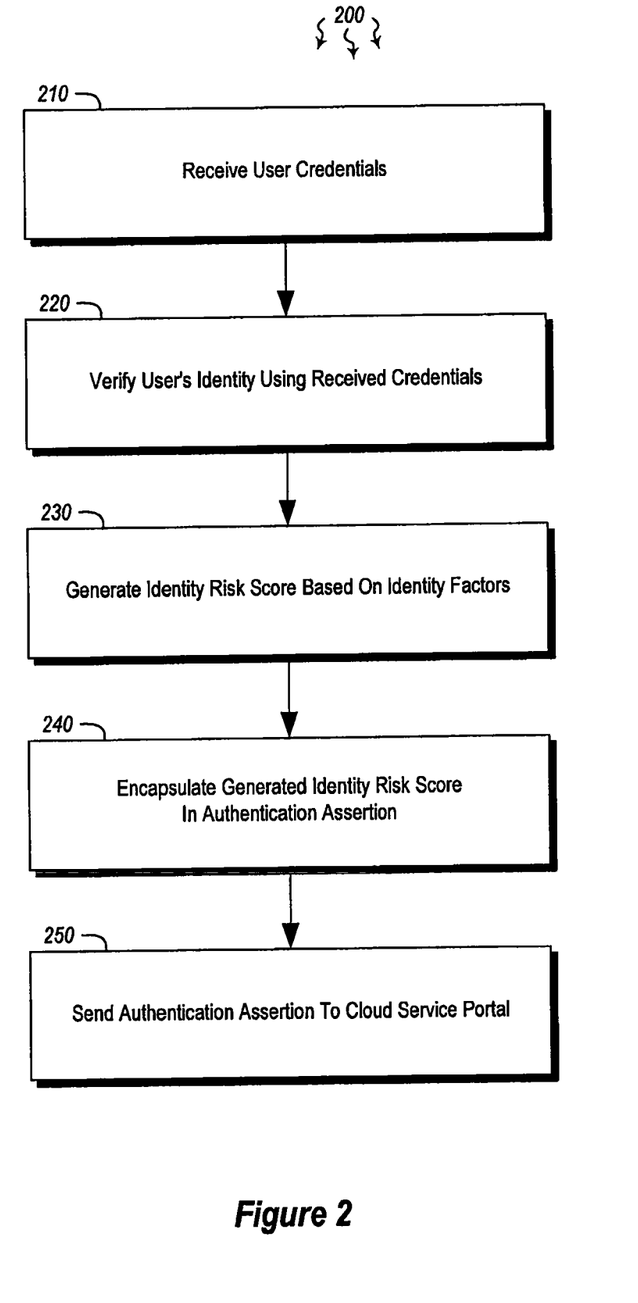
FIG. 2 illustrates a flowchart of an example method for providing an identity risk score as part of an authentication assertion.
Figure 3:
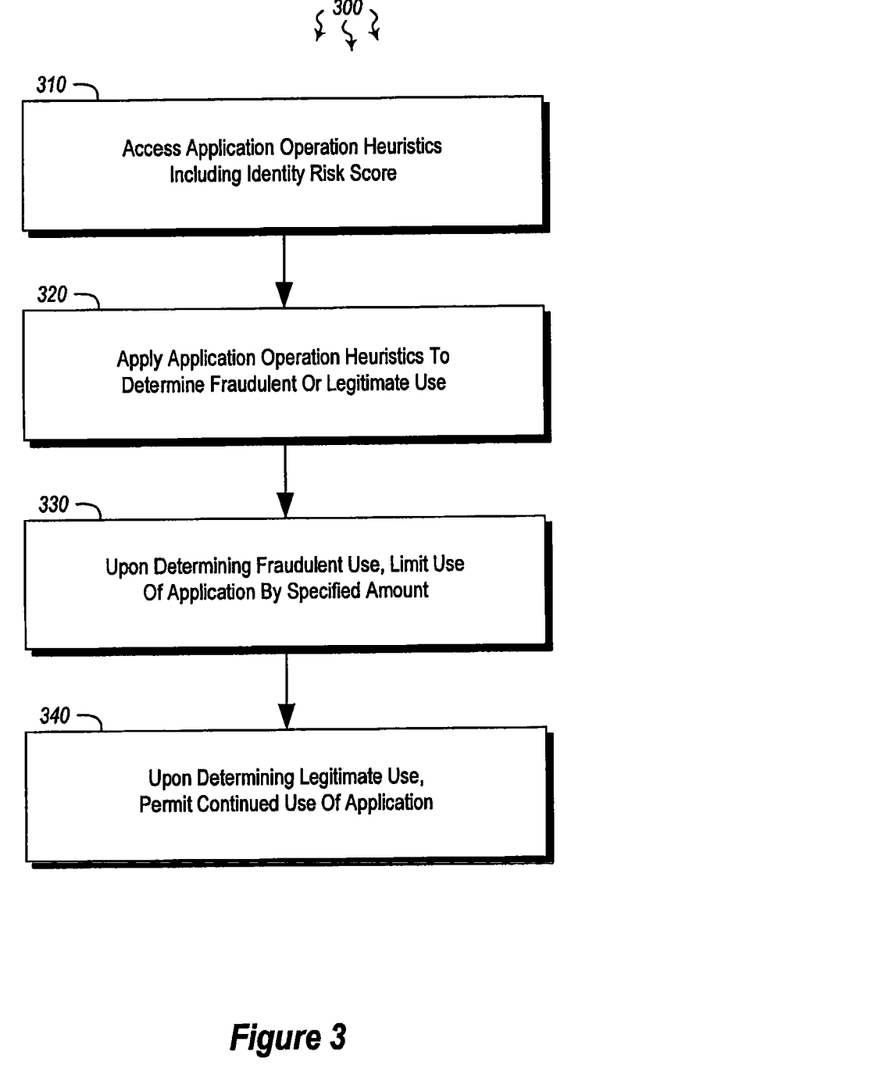
FIG. 3 illustrates a flowchart of an example method for applying operating heuristics to determine an operating application's validity.
Figure 4:
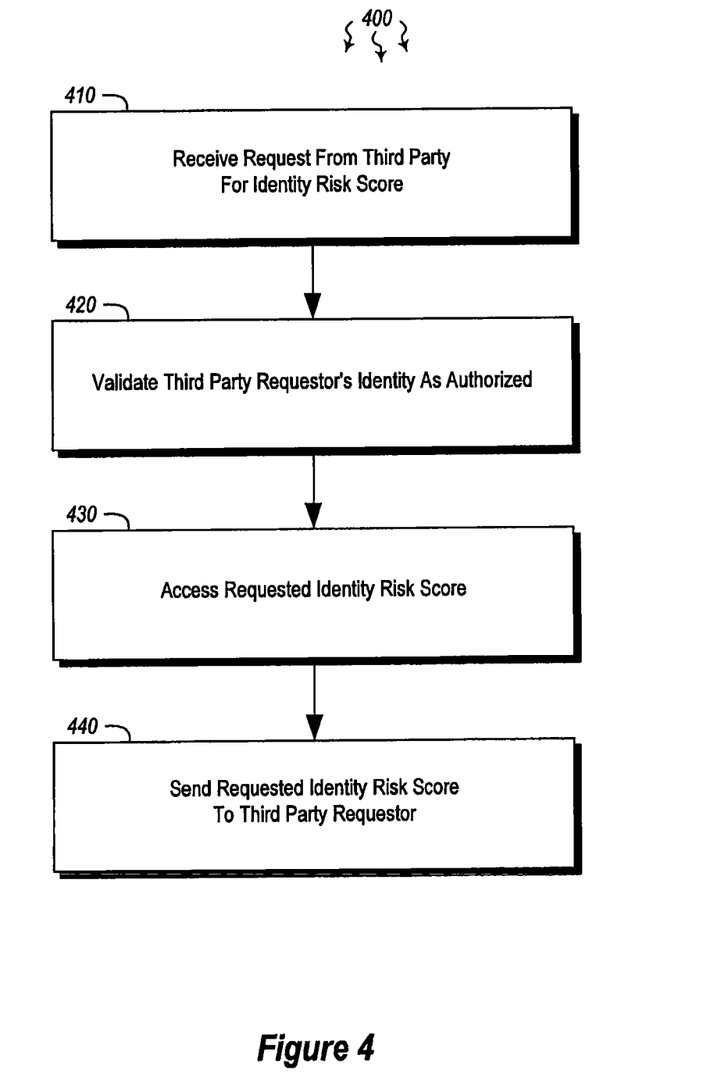
FIG. 4 illustrates a flowchart of an example method for providing identity risk scores to requesting third parties.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing an identity risk score as part of an authentication assertion. The method 200 will now be described with frequent reference to the components and data of environment 100.

Method 200 includes an act of an authentication server receiving from a cloud service portal one or more user credentials from a user, the user credentials identifying a user to the authentication server (act 210). For example, communication module of cloud services portal 101 may receive user credentials 106 from user 105. The credentials identify the user to the cloud service portal and/or to the authentication server. The authentication server may be a separate server or may be incorporated into functionality provided by the cloud service portal. The credentials supplied by the user may include a user name, a password, biometric information or other type of information that would identify the user.

Method 200 also includes an act of the authentication server verifying the user's identity using the received credentials (act 220). For example, identity verifying module 140 may verify user 105's identity using the received user credentials. The authentication server then generates an identity risk score based on one or more identity factors (act 230). The identity factors indicate a likelihood that the user is a valid user. As shown in embodiment 500 of FIG. 5, the identity factors 501 may include the geographic location 401A from which the user is authenticating (known techniques can be used to determine the user's current approximate location). If the user is authenticating from a country which produces a lot of fraudulent activity, the user may be more of a risk.

Figure 5:
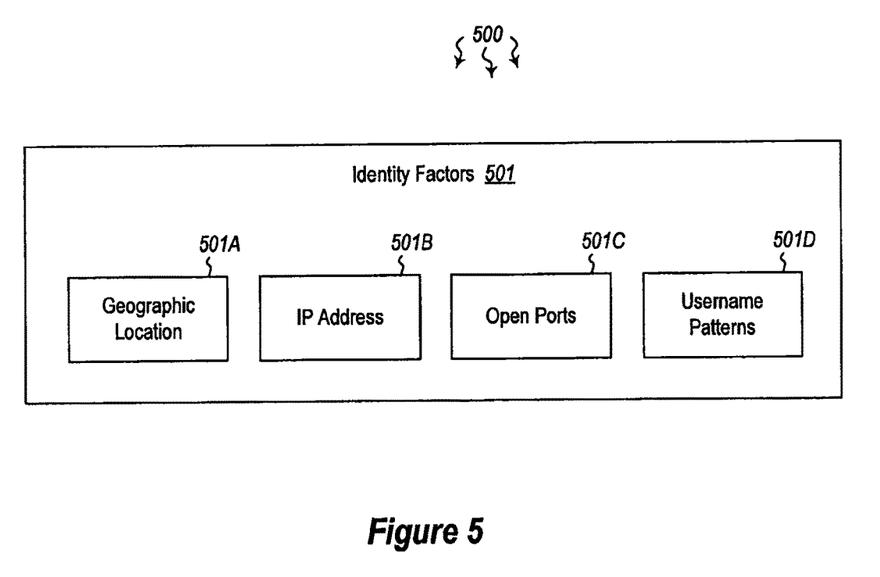
FIG. 5 illustrates example identity factors usable in providing an identity risk score.

Identity factors 401 may also include the user's IP address 501B. If the user is attempting to authenticate from known-bad set of IP addresses, the user may be more of a risk for fraudulent activity. Still further, the identity factors 501 may include the number of ports open 501C by the user's services. The cloud service portal 101 may allow the user to open various ports for the user's various hosted services. If the user is opening an inordinate number of ports, the user may be more of a risk for fraudulent use. Likewise with user name patterns 501D, user names that include certain strings of characters or numbers may often be associated with users that are using the portal fraudulently. It will be understood that the above are merely examples of identity factors and that many other factors or combinations of factors may be used to determine the degree of risk a user provides.

Method 200 next includes an act of the authentication server encapsulating the generated identity risk score in an authentication assertion (act 240). Thus, authentication server 135 may add identity risk score 113 to authentication assertion 114. This authentication assertion may be sent to the communication module 110 of the cloud service portal 101 (act 250). As mentioned above, the authentication assertion may be a Security Assertion Markup Language (SAML) claim. Such SAML claims may be routinely transferred between the authentication server and the cloud service portal.

In some embodiments, existing cloud services or applications 111 (including those currently running and those not currently running) may send requests to the authentication server 135 for a specified user's identity risk score. The identity risk score determining module 145 may generate a new identity risk score (if one does not already exist for that user) based on the identity factors 146, or may update the user's identity risk score 113 based on the identity factors. If the identity risk score is above a threshold level, the cloud service portal 101 may determine that the user is currently logged in to the cloud service portal may (immediately) evict the user from the cloud service portal. Because the user's risk score high enough (i.e. beyond the specified threshold), the user was determined to be a threat and was evicted. If the identity risk score is above another specified threshold level, and the user currently logged in to the cloud service portal, various actions relating to running or managing applications may be prohibiting until the user provides further authentication credentials.

Still further, if the identity risk score is above a specified threshold level, and the user is not currently logged in to the cloud service portal 101, the user may be prevented from logging in to the cloud service portal for a specified amount of time. Alternatively, if the identity risk score 113 is below a specified threshold level, and the user is currently logged in to the cloud service portal, the user may be determined to be a good, valuable user, and the level of service provided to that user may be increased by the cloud service portal (e.g. more processing time, more open ports, more threads, etc.). Accordingly, if a user's score is above or below a threshold number, the user's account may be limited or increased in functionality. This determination may be made while the user is logged in or while the user is logged out. Moreover, this determination may be made periodically at predetermined intervals, or may be made on demand. The user's level of service may be dynamically increased or decreased accordingly. Penalties may be applied and lifted as the user's identity risk score is updated based on the identity factors. At least in some cases, a customizable policy may be used to specify which actions to be taken when predetermined thresholds (high or low) are met in the identity risk score.

FIG. 3 illustrates a flowchart of a method 300 for applying operating heuristics to determine an operating application's validity. The method 300 will now be described with frequent reference to the components and data of environment 100.

Method 300 includes an act of accessing one or more application operation heuristics including a generated identity risk score that is associated with a cloud service user, the identity risk score being based on one or more identity factors that indicate the likelihood that the user is a valid user (act 310). For example, the cloud service portal 101 may access application operation heuristics 112 which include the identity risk score 113 associated with user 105. The heuristics may include various use patterns, login patterns, processing patterns, network patterns or other data. The application operation heuristics may include at least one of the following: geographic location of the user, a determination that the user is authenticating from within a specified range of IP addresses, and the number of open ports currently in use by the user's cloud services. A security principal (i.e. a durable user identifier) may be generated for each cloud service user. The security principal identifies the user across multiple cloud services and/or cloud service domains.

Method 300 also includes an act of applying the application operation heuristics to an application initiated by the cloud service user that is in operation to determine whether the application is being used fraudulently or legitimately (act 320). Accordingly, the cloud service portal may implement the use determining module 115 to determine whether one or more of the user's services hosted on the portal are being used fraudulently. Various use patterns including the heuristics listed above may be used to determine whether the application is being used fraudulently. If the use determining module determines that the application is being used fraudulently, use of that application may be limited by a specified amount (act 330). For instance, the throttling module 120 may throttle resources for the application including processing power, network resources, use privileges or other items. The resources may be throttled to the extent that the user's use is determined to be fraudulent. Accordingly, if the user's application is definitively determined to be fraudulent, the throttling module may block all access to the application 111 by the user 105.

On the other hand, if the use determining module 115 determines that the application is being used legitimately, the user may be permitted continued use of the application (act 340). Still further, if the user has an identity risk score below a specified threshold level (i.e. the user does not pose a substantial risk or poses no risk), the cloud service portal may provide an increased level of computing resources to the application based on the user's identity risk score. In some embodiments, each cloud service user is ranked against various other cloud service users according to the user's associated identity risk score. Thus, each of the cloud service portal's users may be ranked in their degree or likelihood of risk. In such cases, each user may be provided with a commensurate level of services (i.e. those users with a high level of risk receive a lower level of service, and those users with a low level of risk receive a higher level of service). Alternatively, each user may receive the same level of service unless or until that user's level of risk is high enough that throttling is initiated.

Next, FIG. 4 illustrates a flowchart of a method 400 for providing identity risk scores to requesting third parties. The method 400 will now be described with frequent reference to the components and data of environment 100.

Method 400 includes an act of receiving a request from a third party for an identity risk score, the identity risk score being generated based on one or more identity factors that indicate the likelihood that a specified cloud service user is a valid user (act 410). For example, third party user 130 may send request 131 to the cloud service portal 101 requesting an identity risk score for a specified user. The validation module 125 may validate the third party requestor's identity as one who is authorized to receive identity risk scores for the specified cloud service user (act 420). The third party may want to know the identity risk score for a specified individual, for a specified group of individuals, or for various individuals anonymously. The cloud service portal 101 may access the requested identity risk score (act 430) and send it to the third party requestor (act 440). The identity risk score may identify the user(s), or may be sent in an anonymized fashion so that individual cloud service users are not identifiable from the identity risk score.

Accordingly, methods, systems and computer program products are provided which provide an identity risk score as part of an authentication assertion. Moreover, methods, systems and computer program products are provided which apply operating heuristics to determine an operating application's validity and provide identity risk scores to requesting third parties.

Embodiments described herein may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A computer system comprising the following:
one or more processors;
memory; and
one or more computer-readable storage media having stored thereon computer-executable instructions that are executable by the one or more processors to cause the computer system to create and utilize a risk score by causing the computer system to:
access one or more application operation heuristics including a generated identity risk score that is associated with a cloud service user and that is dynamically updated based on one or more detected identity factors that indicate a likelihood that the user is a valid user;
apply the application operation heuristics to an application initiated by the cloud service user, wherein the application determines whether the application is being used fraudulently or legitimately by the cloud service user, and wherein the application uses the identity risk score to determine a level of care the application will use to monitor subsequent actions performed by the cloud service user; and
provide a relative service level to the cloud service user based on the identity risk score that is dynamically updated, wherein the relative service level provided to the cloud service user is distinct from the level of care that the application uses to monitor the subsequent actions performed by the cloud service user, wherein the relative service level includes processing time, and wherein providing the relative service level includes:
dynamically reducing the service level for the cloud service user when the identity risk score of the cloud service user is dynamically updated to be above a threshold, and
dynamically increasing the service level for the cloud service user when the identity risk score is dynamically updated to be below the threshold.

2. The computer system of claim 1, wherein the relative service level is provided to the cloud service user upon a determination being made that the cloud service user has an identity risk score that updated to be below the threshold.

3. The computer system of claim 2, wherein the computer-executable instructions further cause the computer system to provide an increased level of computing resources to the application based on the user's identity risk score.

4. The computer system of claim 1, wherein the computer-executable instructions further cause the computer system to limit use of the application by a specified amount upon determining that the updated identity risk score is above the threshold.

5. The computer system of claim 1, wherein the cloud service user's identity risk score is reevaluated and updated on a customizable periodic basis.

6. The computer system of claim 1, wherein a security principal is generated for the cloud service user, the security principal comprising a durable reference to an identity across multiple cloud services, the durable reference comprising a value corresponding to the identity risk score that is updatable.

7. The computer system of claim 1, wherein the application operation heuristics comprise at least one of the following: a determination that the cloud service user is authenticating from within a specified range of IP addresses, a number of open ports currently in use by the cloud service user's cloud services.

8. One or more hardware storage devices having stored thereon computer-executable instructions that are executable by one or more processors of a computer system to cause the computer system to create and utilize a risk score by causing the computer system to:
access one or more application operation heuristics including a generated identity risk score that is associated with a cloud service user and that is dynamically updated based on one or more detected identity factors that indicate a likelihood that the user is a valid user;

apply the application operation heuristics to an application initiated by the cloud service user, wherein the application determines whether the application is being used fraudulently or legitimately by the cloud service user, and wherein the application uses the identity risk score to determine a level of care the application will use to monitor subsequent actions performed by the cloud service user; and provide a relative service level to the cloud service user based on the identity risk score that is dynamically updated, wherein the relative service level provided to the cloud service user is distinct from the level of care that the application uses to monitor the subsequent actions performed by the cloud service user, wherein the relative service level includes processing time, and wherein providing the relative service level includes:

dynamically reducing the service level for the cloud service user when the identity risk score of the cloud service user is dynamically updated to be above a threshold, and dynamically increasing the service level for the cloud service user when the identity risk score is dynamically updated to be below the threshold.

9. The one or more hardware storage device of claim 8, wherein the computer-executable instructions further cause the computer system to obtain the identity risk score from an authentication server, wherein the identify risk score is encapsulated in an authentication assertion from the authentication server.

10. The one or more hardware storage device of claim 9, wherein the authentication assertion comprises a Security Assertion Markup Language (SAML) claim.

11. The one or more hardware storage device of claim 9, wherein the identity risk score is generated by the authentication server in response to the authentication server receiving, from a cloud service portal, one or more user credentials from the cloud service user that identify the cloud service user to the authentication server, and wherein the identity risk score is based on identity factors that indicate a likelihood that the cloud service user is a valid user.

12. The one or more hardware storage device of claim 11, wherein the identity factors include at least one or more patterns in a user name of the cloud service user.

13. The one or more hardware storage device of claim 8, wherein determining whether the application is being used fraudulently or legitimately includes the following:

determining whether the identity risk score is above a threshold level.

14. The one or more hardware storage device of claim 13, wherein the computer-executable instructions further cause the computer system to determine whether the cloud service user is currently logged in to the cloud service portal, and, in response to determining that the cloud service user is currently logged in, evict the cloud service user from the cloud service portal.

15. The one or more hardware storage device of claim 13, wherein the computer-executable instructions further cause the computer system to determine whether the cloud service user is currently logged in to the cloud service portal, and, in response to determining that the cloud service user is currently logged in, prohibit one or more specified actions until the cloud service user provides further authentication credentials.

16. The one or more hardware storage device of claim 13, wherein the computer-executable instructions further cause the computer system to determine whether the cloud service user is not currently logged in to the cloud service portal, and, in response to determining that the cloud service user is not currently logged in, prevent the cloud service user from logging in to the cloud service portal.

17. The one or more hardware storage device of claim 8, wherein the computer-executable instructions further cause the computer system to determine whether the identity risk score is below a threshold level and, upon determining that the cloud service user is currently logged in to the cloud service portal, increase a level of service provided to the user by the cloud service portal.

18. A method, implemented by a computing system that includes one or more processors, for applying operating heuristics to determine an operating application's validity, the method comprising:

accessing one or more application operation heuristics including a generated identity risk score that is associated with a cloud service user and that is dynamically updated based on one or more detected identity factors that indicate a likelihood that the user is a valid user;

applying the application operation heuristics to an application initiated by the cloud service user, wherein the application determines whether the application is being used fraudulently or legitimately by the cloud service user, and wherein the application uses the identity risk score to determine a level of care the application will use to monitor subsequent actions performed by the cloud service user; and providing a relative service level to the cloud service user based on the identity risk score that is dynamically updated, wherein the relative service level provided to the cloud service user is distinct from the level of care that the application uses to monitor the subsequent actions performed by the cloud service user, wherein the relative service level includes processing time, and wherein providing the relative service level includes:

dynamically reducing the service level for the cloud service user when the identity risk score of the cloud service user is dynamically updated to be above a threshold, and dynamically increasing the service level for the cloud service user when the identity risk score is dynamically updated to be below the threshold.

19. The method of claim 18, wherein the method further comprises:

upon determining that the application is being used fraudulently, dynamically throttling services for the application to the extent that the use of the application is determined to be fraudulent, the services including at least one of processing time, open ports or threads provided to the cloud service user; and upon determining that the application is being used legitimately, dynamically increasing services for the application to the extent that the use of the application is determined to be legitimate, the services including at least one of processing time, open ports or threads provided to the cloud service user.

* * * * *